US009363508B2

(12) United States Patent
Hellman

(10) Patent No.: US 9,363,508 B2
(45) Date of Patent: Jun. 7, 2016

(54) DELTA QP HANDLING IN A HIGH EFFICIENCY VIDEO DECODER

(71) Applicant: Broadcom Corporation, Irvine, CA (US)

(72) Inventor: Timothy Hellman, Concord, MA (US)

(73) Assignee: Broadcom Corporation, Irvine, CA (US)

( * ) Notice: Subject to any disclaimer, the term of this patent is extended or adjusted under 35 U.S.C. 154(b) by 617 days.

(21) Appl. No.: 13/714,359

(22) Filed: Dec. 13, 2012

(65) Prior Publication Data

US 2014/0072036 A1    Mar. 13, 2014

Related U.S. Application Data

(60) Provisional application No. 61/700,173, filed on Sep. 12, 2012.

(51) Int. Cl.
| | | |
|---|---|---|
| *H04N 7/26* | (2006.01) | |
| *H04N 19/124* | (2014.01) | |
| *H04N 19/176* | (2014.01) | |
| *H04N 19/86* | (2014.01) | |
| *H04N 19/196* | (2014.01) | |

(52) U.S. Cl.
CPC ......... *H04N 19/0009* (2013.01); *H04N 19/124* (2014.11); *H04N 19/176* (2014.11); *H04N 19/198* (2014.11); *H04N 19/86* (2014.11)

(58) Field of Classification Search
None
See application file for complete search history.

(56) References Cited

U.S. PATENT DOCUMENTS

| | | | |
|---|---|---|---|
| 2003/0093445 A1* | 5/2003 | Schick et al. | ................. 707/205 |
| 2005/0171763 A1* | 8/2005 | Zhou et al. | .................... 704/201 |
| 2005/0259742 A1* | 11/2005 | Hellman | .................. 375/240.23 |
| 2007/0294745 A1 | 12/2007 | Tan et al. | |
| 2009/0183009 A1 | 7/2009 | Delfs et al. | |
| 2010/0074338 A1* | 3/2010 | Yamori et al. | ........... 375/240.16 |
| 2012/0183049 A1* | 7/2012 | Liu et al. | .................. 375/240.03 |
| 2012/0198224 A1 | 8/2012 | Leclercq | |

FOREIGN PATENT DOCUMENTS

| | | |
|---|---|---|
| WO | WO 00/68791 A1 | 11/2000 |
| WO | WO 2007/118154 A2 | 10/2007 |
| WO | WO 2011/109780 A2 | 9/2011 |

OTHER PUBLICATIONS

European Search Report for Application No. 13003690.8-1956 dated Nov. 8, 2013.

* cited by examiner

*Primary Examiner* — Kate Luo
(74) *Attorney, Agent, or Firm* — Brinks Gilson & Lione

(57) ABSTRACT

A system and method are provided including a deblocker processor that reads a first data load for a first processing block from a buffer. The deblocker processor holds the first data load in a storage array in response to the first data load not including a valid value for a first quantization parameter and receives a second data load for a second processing block from the buffer. In response to the second data load including a valid value for a second quantization parameter, the deblocker processor processes the first processing block based on the second quantization parameter.

6 Claims, 4 Drawing Sheets

DELTA QP HANDLING IN A HIGH EFFICIENCY VIDEO DECODER

CROSS REFERENCE TO RELATED APPLICATIONS

This application claims the benefit of U.S. Provisional Patent Application No. 61/700,173 filed Sep. 12, 2012, the content of which is hereby incorporated by reference in its entirety.

BACKGROUND

The present application generally relates to improved image processing, and particularly relates to an improved decoding using the High Efficiency Video Coding (HEVC) video standard.

BRIEF DESCRIPTION OF THE DRAWINGS

The drawings described herein are for illustration purposes only and are not intended to limit the scope of the present disclosure in any way.

It should be understood that throughout the drawings, corresponding reference numerals indicate like or corresponding parts and features.

DETAILED DESCRIPTION

The present disclosure provides systems and methods for improved video decoding. In some implementations, a system may be provided that includes a deblocker processor. The deblocker processor may be operable to read a first data load for example a set of control parameters for a first processing block from a buffer. The deblocker processor may be further operable to hold the first data load in a storage array if the first data load does not include a first quantization parameter. The deblocker processor may be further operable to read a second data load for a second processing block from the buffer. The deblocker processor may be further operable to process, if the second data load includes a second quantization parameter, the first processing block based on the second quantization parameter.

In some implementations, a method may be provided that may be performed by a deblocker processor and that may include the following steps. The method may include reading a first data load for a first processing block from a buffer. The method may further include determining if the first data load includes a first quantization parameter. The method may further include holding the first data load in a storage array if the first data load does not include a first quantization parameter. The method may further include reading a second data load for a second processing block from the buffer. The method may further include processing, if the second data load includes a second quantization parameter, the first processing block based on the second quantization parameter.

In some implementations, a system may be provided that includes a decoder operable to use High Efficiency Video Coding (HEVC). The decoder may include a deblocker processor. The deblocker processor may be operable to read a first data load for a first processing block from a buffer. The deblocker processor may be further operable read a first data load for a first processing block from a buffer. The deblocker processor may be further operable to determine if the first data load includes a first quantization parameter or a non-valid value, the non-valid value indicating that a quantization parameter has not yet arrived for the first processing block. The deblocker processor may be further operable to hold the first data load in a storage array if the first data load includes the non-valid value. The deblocker processor may be further operable to read a second data load for a second processing block from the buffer. The deblocker processor may be further operable process, if the second data load includes a valid quantization parameter, the first and second processing blocks based on the valid quantization parameter.

Figure 1:
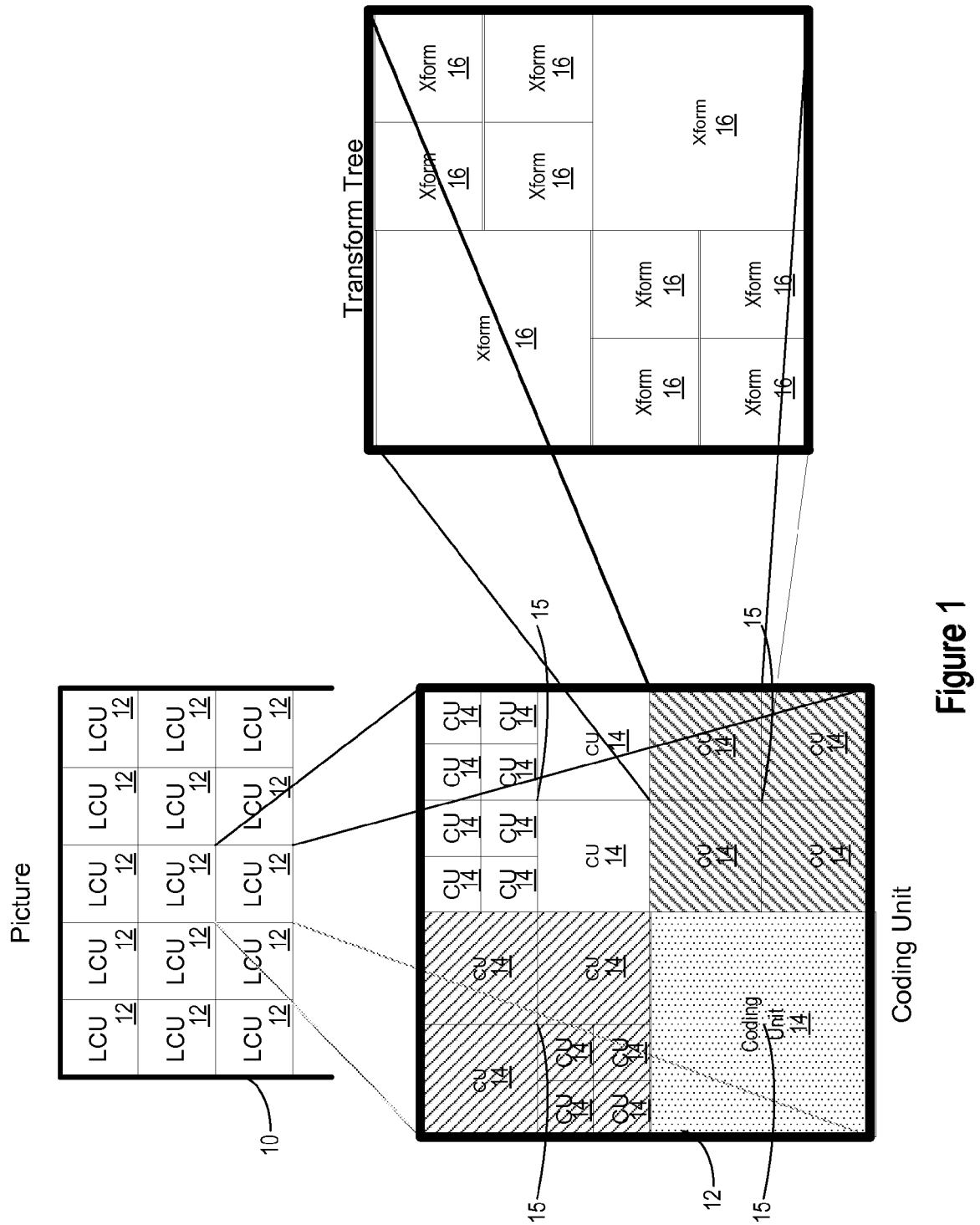
FIG. 1 is a schematic view illustrating a picture which may be encoded according to the High Efficiency Video Coding (HEVC) video standard.

FIG. 1 illustrates a picture 10 which may be encoded according to the High Efficiency Video Coding (HEVC) video standard. To optimize coding efficiency, the picture 10 may be divided into processing blocks (e.g. blocks of data, coding units, or pixel data) of various sizes according to a recursive tree split, as described in more detail below. Initially, the picture may be divided into Largest Coding Units (LCUs) 12 of equal size, each of which may define the largest-size coding unit permitted by the video standard. The LCUs 12 may be squares having 64×64 pixels, for example. The LCUs 12 may contain one or more squares called a coding units (CUs) 14. In some implementations, the LCUs 12 may be sub-divided into many smaller squares (CUs) 14 if the LCUs 12 contain a sufficient level of graphic detail or activity. The CUs may be squares having 8×8, 16×16, 32×32 or 64×64 pixels, for example. Thus, the LCUs 12 may each be divided into four processing blocks (PBs) 15, which each contain one or more CUs 14 or only a portion of a CU 14. The LCUs 12 may be encoded in raster order, and the CUs 14 may be encoded using a recursive 'Z' scan. In some implementations, the PBs 15 may be processed in block-raster order, as if the LCU 12 had been divided into 4 CUs 14, regardless of the number of CUs 14 actually contained in the LCU 12. CUs 14 may be further sub-divided into transform blocks called transform units (TUs) 16 if the CUs 14 contain a sufficient level of graphic detail or activity. The largest size for a TU 16 may be 32×32 pixels, for example.

Figure 2:
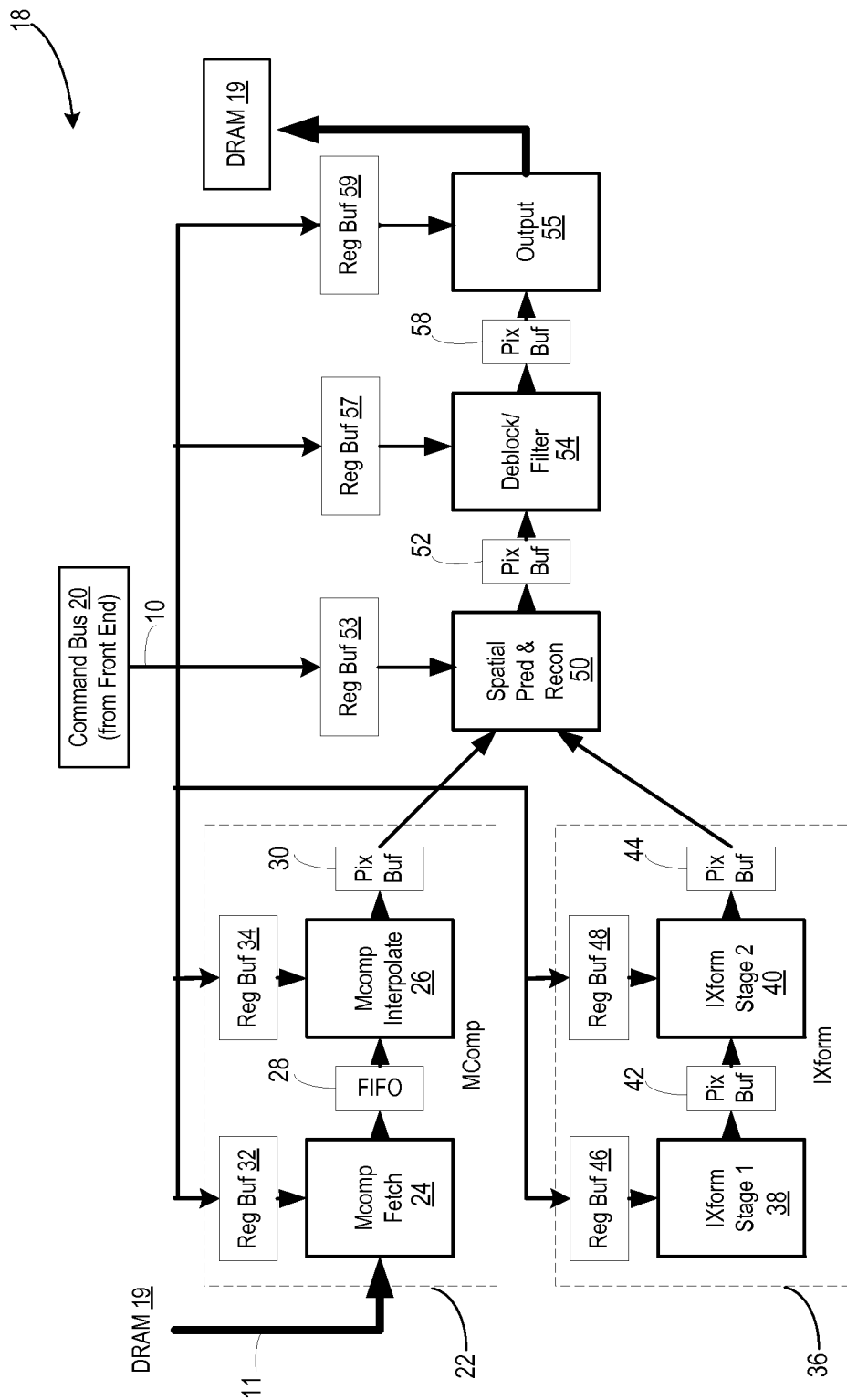
FIG. 2 is a schematic view illustrating a pipeline which may process pixels and decode pictures according to the HEVC video standard.

FIG. 2 illustrates a pipeline 18 which may process pixels and decode pictures 10 according to the HEVC video standard. Although the pipeline 18 shown may implement various components, buffers, and processors in serial and/or parallel in particular ways, the pipeline 18 may be configured to implement these components, buffers, and processors in serial and/or parallel in other ways without falling outside the scope of the invention. The pipeline 18 may include a front-end and a back-end. The back-end stages of the pipeline 18 may first receive data used to decode a current picture 10 (including its current processing blocks) from command bus 20, which is in communication with the front-end of the pipeline 18. Meanwhile, a memory such as a DRAM 19 may provide a previous picture 11 to the motion compensation fetch processor 24. The back-end stages include motion compensation, inverse transform, spatial prediction, and loop filtering. The pipeline 18 may include a command bus 20 (e.g. common register bus). One exemplary implementation, of the stages of the pipeline 18 are described in detail as follows. However, other orders and/or combinations of stages are contemplated herein.

Since the processing block has already been processed by stages in the front-end of the pipeline 18, the processing block may be represented by command parameters e.g. motion vectors and/or transform coefficients as described in more detail below. Since motion pictures use at least 24 frames per second, it is possible that successive pictures 10 may have similar content that may differ primarily by movement. Thus, for a given processing block of a current picture 10, a reference picture (e.g. the previous picture 11) may be searched to find a similar appearing processing block (known as a reference block). The reference block of the reference picture may not necessarily be aligned with corresponding processing block of the current picture 10. The processing blocks of the picture 10 may be predicted from other spatially separated processing blocks of the picture 10 blocks, predicted from one other picture (e.g. the previous picture 11), or predicted from two pictures (e.g. two previous pictures 11), for example. Thus, processing blocks may be represented by a set of prediction errors relative to their reference blocks, and an identification of the similar appearing reference blocks (if they are predicted at all). The reference blocks may be identified by motion vectors, which may describe the spatial displacement between the processing blocks of the current picture 10 and the similar appearing blocks.

Each CU 14 may also include or be assigned a quantization parameter (QP) which may corresponds to or set the compression level of the processing block (e.g. CU 14). As such, the QP can be thought of as a quality "knob." The QP may vary for each CU in the picture 10. However, the QP value may not vary much from CU to CU. Thus, a 'delta QP' value, which is difference between the desired QP and a predicted QP value, may be encoded in the stream rather than an absolute QP value, thus reducing storage requirements. The predicted value is formed from the delta QP of neighboring CUs 14. The location of the delta QP in the processing block may depend on the distribution of transform coefficients. For example, the delta QP may arrive or may be encoded immediately before or with the first TU 16 in the CU 14 that has transform coefficients. Thus, some TUs 16 in a CU 14 may have no transform coefficients.

Figure 3:
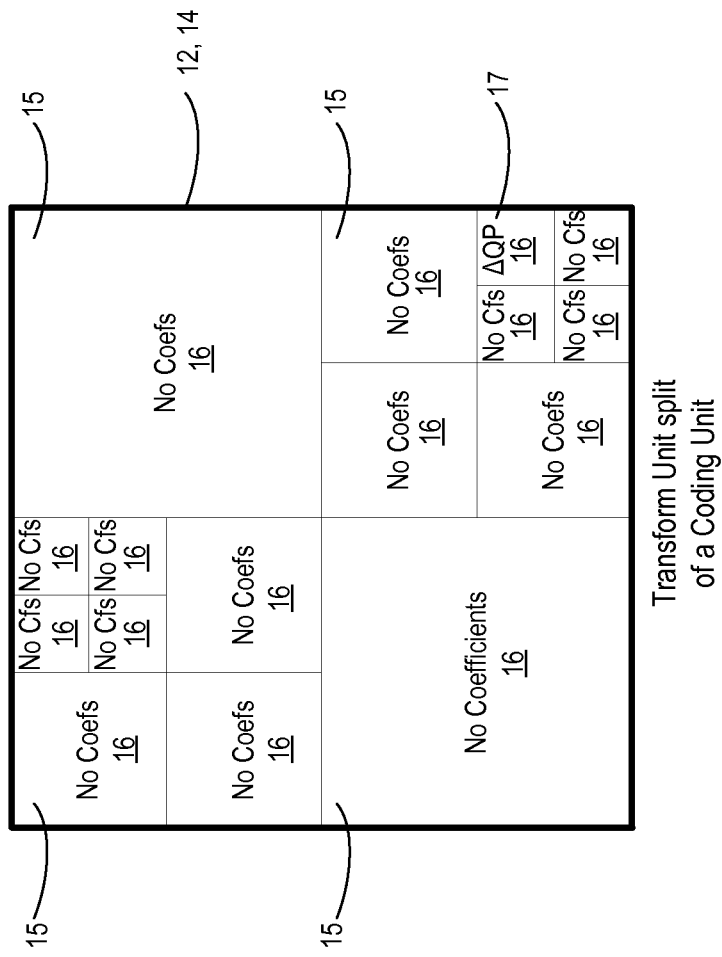
FIG. 3 is a schematic view illustrating a 64×64 largest coding unit, one 64×64 coding unit, and four 32×32 processing blocks and several transform units.

FIG. 3 illustrates a 64×64 LCU 12 having one 64×64 CU 14 and four 32×32 PBs 15. The CU 14 may be subdivided into the TUs 16. In this example, only the last TU 21 in the CU 14 may have coefficients. Thus, the delta QP 17, which may apply to the entire CU 14 and may be the only delta QP for the CU 14, may arrive or may be encoded immediately before or with the last TU 21.

Turning back to FIG. 2, the pipeline 18 may include a motion compensation processor 22, which may include sub-stages, including a motion compensation fetch processor 24 and a motion compensation interpolation processor 26. A command buffer 32 (e.g. a FIFO) may provide data loads (which as referenced throughout the application may include any combination of e.g. set-up control parameters such as filtering parameters including deblocking parameters, QP parameters or delta QP, transform coefficients, transform block edges, motion vectors or motion vector differences) from the command bus 20 to the motion compensation fetch processor 24. The motion compensation fetch processor 24 may fetch the information used to construct the processing blocks (e.g. motion vectors, transform coefficients) from the command buffer 32 and the previous picture 11 from the DRAM 19. A first-in-first-out buffer 28 (FIFO) may provide the processed processing blocks and previous picture 11 data from the motion compensation fetch processor 24 to the motion compensation interpolation processor 26. A command buffer 34 (e.g. a FIFO) may provide data loads (e.g. register loads, e.g. transform coefficients, motion vectors, etc.) from the command bus 20 to the motion compensation interpolation processor 26. The motion compensation interpolation processor 26 may process the motion vectors and the data from FIFO 28 to construct a prediction of the current picture 10 using the information provided through the command buffer.

A pixel buffer 30 (e.g. a memory double buffer) may be provided at the output of the motion compensation processor 22 to hold the partially reconstructed processing blocks. The pixel buffer 30 may be a double-buffer so that there is enough room for two processing blocks in each double-buffer, and so that one processor may output a processing block into the double-buffer, while another processor is reading a processing block from the double-buffer.

The pipeline 18 may further include an inverse transform processor 36, which may include sub-stages, including a first inverse transform stage processor 38 and a second inverse transform stage processor 40. Command buffers 46 and 48 (e.g. FIFOS) may provide data loads (e.g. including information for reconstructing the processing blocks of the current picture 10 represented e.g. by transform coefficients, and/or delta QPs 17 for the processing blocks) from the command bus 20 respectively to the first and second inverse transform stage processors 38 and 40. A pixel buffer 42 (e.g. a memory double buffer) may be provided at the output of the first inverse transform stage processor 38 to hold the processed processing blocks and previous picture 11 data and to provide these data to the second inverse transform stage processor 40. A pixel buffer 44 (e.g. a memory double buffer) may be provided at the output of the second inverse transform stage processor 40 to hold the partially reconstructed processing blocks.

The pipeline 18 may further include a spatial prediction processor 50 (e.g. spatial prediction and reconstruction processor). A command buffer 53 (e.g. a FIFO) may provide data loads (e.g. register loads, e.g. including information to reconstruct processing blocks of the current picture 10 represented e.g. by transform coefficients and/or including delta QPs 17 for the processing blocks) from the command bus 20 to the spatial prediction processor 50. The spatial prediction processor 50 may receive respective parts of partially reconstructed processing blocks that are provided by the pixel buffers 30 and 44. The spatial prediction processor 50 may add these parts to creating a more fully reconstructed processing block. A pixel buffer 52 (e.g. a memory double buffer) may be provided at the output of the spatial prediction processor 50 to hold the more fully reconstructed processing blocks.

The pipeline 18 may further include a deblocker processor 54 (e.g. loop filtering processor) that receives processed processing blocks that are provided by the pixel buffer 52. A command buffer 57 (e.g. a FIFO) may provide data loads (e.g. including information for reconstructing the processing blocks of the current picture 10 represented e.g. by transform coefficients, and/or delta QPs 17 for the processing blocks) from the command bus 20 to the spatial prediction processor 50. The deblocker processor 54 may implement 2D filtering. The deblocker processor 54 may use the value of the delta QP 17 to set the proper level of filtering to smoothen or eliminate artifacts at transform edges which may result from reconstruction. A pixel buffer 58 (e.g. a memory double buffer) may be provided at the output of the deblocker processor 54 to hold the smoothed processing blocks.

The pipeline 18 may further include an output stage 55 (e.g. output processor) that receives processing blocks that are provided by the pixel buffer 59. A command buffer 61 may provide data loads (e.g. register loads, e.g. including information for constructing processing blocks of the current picture 10 represented e.g. transform coefficients and delta QPs 17 for the processing blocks) from the command bus 20 to the output stage 55. Once the output stage 55 completes processing, the output stage 55 may provide the fully reconstructed processing blocks back to the DRAM 19. Once all the reconstructed processing blocks of the reconstructed current picture 10 are provided to the DRAM 19, the reconstructed picture 10 may then be read from the DRAM 19 to be used as a reference picture (e.g. become a previous picture 11) during the next decoding iteration, e.g. during decoding of the next picture 10.

Figure 4:
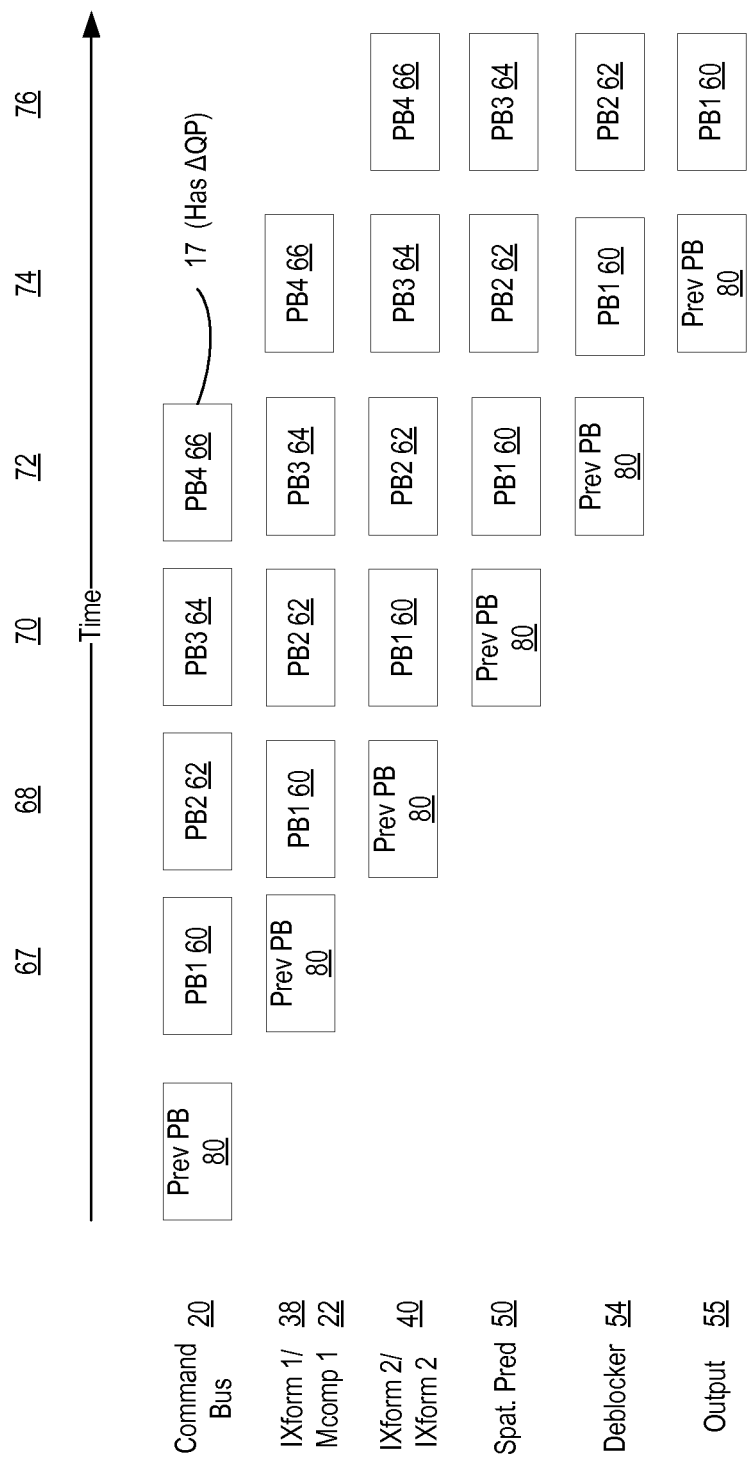
FIG. 4 is a schematic view illustrating processing of four successive processing blocks as they pass through six time stages of the pipeline for processing.

FIG. 4 illustrates the processing of four successive processing blocks 60, 62, 64, and 66 as they pass through six time stages 67, 68, 70, 72, 74, and 76 of the pipeline 18 for processing. A processing block 80 that may have been processed prior to the first processing block 60 is also shown. The processing blocks 60, 62, 64, and 66 may all be LCUs 12, or may all be CUs 14, or may all be PBs 15, or may be combinations thereof.

At first time stage 67, the command bus 20 may provide a first data load (e.g. register loads, e.g. including the information to reconstruct the first processing block 60 represented e.g. by transform coefficients, motion vectors, and/or including delta QPs 17 for the first processing block 60) to the command buffers 32, 34, 46, 48, 53, 57, and 59.

At second time stage 68, the command bus 20 may provide a second data load (e.g. register loads, e.g. including the information to reconstruct the second processing block 62 represented e.g. by transform coefficients, motion vectors, and/or including delta QPs 17 for the second processing block 62) to the command buffers 32, 34, 46, 48, 53, 57, and 59. The command buffers 32, 34, and 46 may respectively provide the first data load to the motion compensation fetch processor 24, motion compensation interpolation processor 26, and the first inverse transform stage processor 38. The DRAM 19 may provide reference processing blocks of the reference picture (e.g. previous picture 11) to the motion compensation processor 22, which may then process the first processing block 60. The motion compensation fetch processor 24 may then provide parts of the first processing block 60 to the FIFO 28. The FIFO 28 may provide the parts of the first processing block 60, as they arrive, to the motion compensation interpolation processor 26 in a first-in-first-out order. In parallel to the processing by the motion compensation processor 22, the first inverse transform stage 38 may process the first processing block 60 based on the first data load. Once the motion compensation interpolation processor 26 finishes processing the first processing block 60, the part of the partially processed first processing block 60 may be provided to the pixel buffer 30. Once the first inverse transform stage processor 38 finishes processing (e.g. performs the first dimension of the inverse transform on) the first processing block 60, the first processing block 60 may be provided to the pixel buffer 42.

At third time stage 70, the command bus 20 may provide a third data load (e.g. register loads, e.g. including information for reconstructing the third processing block 64 represented e.g. by transform coefficients, motion vectors, and/or including delta QPs 17 for the third processing block 64) to the command buffers 32, 34, 46, 48, 53, 57, and 59. The command buffer 48 may provide the first data load to the second inverse transform stage processor 40. The pixel buffer 42 may provide the processed first processing block 60 to the second inverse transform stage processor 40. Once the second inverse transform stage processor 40 finishes processing (e.g. performs the second dimension of the inverse transform on) the first processing block 60, the part of the partially reconstructed first processing block 60 may be provided to the pixel buffer 44. Additionally, at third time stage 70, the second processing block 62 may be processed in the same way that the first processing block 60 was processed at second time stage 68.

At fourth time stage 72, the command bus 20 may provide a fourth data load (e.g. register loads, e.g. including information to reconstruct the fourth processing block 66 represented e.g. by transform coefficients, motion vectors, and/or including delta QPs 17 for the fourth processing block 66) to the command buffers 32, 34, 46, 48, 53, 57, and 59. The command buffer 53 may provide the first data load to the spatial prediction processor 50. The pixel buffers 30 and 44 may provide their respective processed parts of the partially reconstructed first processing block 60 to the spatial prediction processor 50. The spatial prediction processor 50 may add these parts, and perform further processing. Once the spatial prediction processor 50 finishes processing the first processing block 60, the mostly reconstructed first processing block 60 may be provided to the pixel buffer 52. Additionally, at fourth time stage 72, the third processing block 64 may be processed in the same way that the first processing block 60 was processed at second time stage 68, and the second processing block 62 may be processed in the same way that the first processing block 60 was processed at third time stage 70.

At fifth time stage 74, the command buffer 57 may provide the first data load to the deblocker processor 54. The pixel buffer 52 may provide the mostly reconstructed first processing block 60 to the deblocker processor 54. The deblocker 54 may use the mostly reconstructed processing block 60 along with the delta QPs 17 to perform filtering. Once the deblocker processor 54 finishes processing the first processing block 60, the reconstructed first processing block 60 may be provided to the pixel buffer 58. Additionally, at fifth time stage 74, the fourth processing block 66 may be processed in the same way that the first processing block 60 was processed at second time stage 68, and the third processing block 64 may be processed in the same way that the first processing block 60 was processed at third time stage 70, and the second processing block 62 may be processed in the same that the first processing block 60 was processed at the fourth time stage 72.

At sixth time stage 76, the command buffer 61 may provide the first data load to the output stage 55. The pixel buffer 58 may provide the reconstructed first processing block 60 to the output stage 55. Once the output stage 55 completes processing, the output stage 55 may provide the reconstructed first processing block 60 back to the DRAM 19 in a fully decoded state for use in the next iteration of decoding, as discussed earlier. Additionally, at sixth time stage 76, the fourth processing block 66 may be processed in the same way that the first processing block 60 was processed at third time stage 70, and the third processing block 64 may be processed in the same way that the first processing block 60 was processed at fourth time stage 72, and the second processing block 62 may be processed in the same that the first processing block 60 was processed at the fifth time stage 74.

For efficient pipeline operation, the size of the processing block processed by each stage of the pipeline 18 may be the same. For example, two LCUs 12 (rather than one LCU 12) may be processed by each stage, because the pixel buffers 30, 42, 44, 52, and 58 may each be double-buffers. As discussed earlier, since there is enough room for two processing blocks in each double-buffer, one processor may output a processing block into the double-buffer, while another processor is reading a processing block from the double-buffer. However, because each LCU 12 may have a size of 64×64 pixels, the pixel buffers 30, 42, 44, 52, and 58 may each be required to be large. For example, since two LCUs 12 may include 64×64×2 luma pixels, which may require 8 kilobytes of storage, and 32×32×2×2 chroma pixels, which may require 4 kilobytes of storage, two LCUs 12 may require 12 kilobytes of storage in total. Thus, overall required buffer storage for all stages may be nearly 100K, which may be expensive to implement on a chip.

However, the pixel buffers 30, 42, 44, 52, and 58 may be reduced in size to handle two processing blocks sized at 32×32 pixels rather than two LCUs 12. Since four 32×32 blocks fit into a 64×64 block, the pixel buffers 30, 42, 44, 52, and 58 thus may be required to be only a quarter of the size required for two LCUs 12. This reduction may be possible because the maximum size of each TUs 16 is 32×32. All the other operations are separable, and therefore can operate on a smaller block size. For example, PBs 15, which are 32×32 processing blocks containing one or more CUs 14, may be processed separately. Thus, the PBs 15 may be processed in block-raster order, as if the LCU had been divided into 4 CUs, resulting on significant cost savings to the overall design.

However, as discussed with respect to FIG. 3, some PBs 15 may not have any transform coefficients, and thus the delta QP 17 assigned to those PBs 15 may not be loaded until a later processing block 15 is loaded. In the worst case, three consecutive processing blocks 15 may not include their assigned delta QP 17, and the delta QP 17 may not be loaded until the fourth PB 15 is loaded. As such, the deblocker processor 54 may not be able to process the PB 15 (or other processing block), since the assigned delta QP 17 has not yet arrived.

To solve this problem, it is possible to take advantage of the position of the deblocker processor 54 in the processing pipeline 18. Since the deblocker processor 54 may operate three time stages ahead of the motion compensation processor 22 and the first inverse transform stage processor 38, the deblocker processor 54 may start processing the first processing block 60 (which may be e.g. a first PB 15 of a CU 14) after the command bus 20 has already provided the data load for the fourth processing blocks 66. Thus, all four data loads for the processing blocks 60, 62, 64, and 66 may already be buffered in the command buffer 57. Normally, the deblocker processor 54 may use the data load for the processing block (e.g. PB 15) currently being processed from the command buffer 57 and may create data structures it needs for processing, and then may process the pixels for that PB 15.

However, since data loads for a particular PB 15 may not have a valid delta QP 17, the deblocker processor 54 may not be able to process the current processing block. Thus, until arrival of a PB 15 with a valid delta QP 17, the data load for the current processing block (e.g. PBs 15) without delta QPs 17 may be held (e.g. stored) in a storage array 78 (e.g. data structure) determined by (e.g. created by) and in communication with the deblocker processor 54. In some examples, the storage array 78 may be located in the deblocker processor 54, embedded in the deblocker processor 54, or located external to the deblocker processor 54. At its bottom layer, the storage array 78 may be a static RAM. At a layer above the static RAM, the storage array 78 may be a FIFO. Upon arrival of a processing block (e.g. PB 15) with a valid delta QP 17 value, the deblocker processor 54 may use the valid delta QP 17 to filter the current processing block and all other processing blocks (e.g. PBs 15) held in the storage array 78. For example, if the first, second, and third PBs 15 did not have delta QPs 17, then upon arrival of the fourth PB 15 with a delta QP 17, the deblocker processor 54 may filter all four PBs 15 using the delta QP 17 of the fourth PB 15. The deblocker processor 54 may continue processing (e.g. filtering) until all stored parameters in the storage array 78 (e.g. all of the PBs 15 stored in the storage array 78) are exhausted (e.g. finished reading). As each processing block (e.g. PB 15) is processed by the deblocker processor 54, the data load for that processing block may be read out of the storage array 78 to make room for another data load. The read in and read out of the data loads may occur on a first-in-first-out basis.

As shown, the pixels associated with first processing block 60 (e.g. first PB 15) may not arrive at the deblocker processor 54 until after the data load for the fourth processing block 66 (e.g. fourth PB 15) have arrived, and all four data loads for the processing blocks 60, 62, 64, and 66 may already be buffered in the command buffer 57. Thus, the deblocker processor 54 may receive and hold all of the data loads for the four processing blocks 60, 62, 64, and 66 (e.g. four PBs 15) in the storage array 78 before processing the first processing block 60 (e.g. first PB 15). This does not delay the pipeline 18, since the data loads arrive before the four processing blocks 60, 62, 64, and 66 processed through the pipeline 18.

The command buffers 32, 34, 46, 48, 53, 57, and 59 may be progressively larger depending how on far downstream they are in the pipeline 18. For example, since the motion compensation processor 22 and the first inverse transform stage processor 38 may process a processing block in time stage 68 immediately after the that processing block's data load arrives in the command buffers 32, 34, 46, 48, 53, 57, and 59 in time stage 67 (one stage after data load arrival), the command buffers 32 and 34 may be sized to hold one data load. Since the second inverse transform stage processor 40 may process that processing block in time stage 70 (two stages after data load arrival), the command buffers 48 may be sized to hold two data loads. Since the spatial prediction processor 50 may process that processing block in time stage 72 (three stages after data load arrival), the command buffer 53 may be sized to hold three data loads. Since the deblocker processor 54 may process that processing block in time stage 74 (four stages after data load arrival), the command buffer 57 may be sized to hold four data loads.

The operation of the deblocker processor 54 may be based on or affected by various parameters, including the location of transform edges, whether the processing block is intra or inter coded, and the delta QP 17 value, for example. Additionally, each 32×32 PB 15 may be broken into four 16×16 blocks, a series of 32-bit data loads may carry the parameters for each of the four 16×16 blocks. Four delta QP 17 values may be passed for each 16×16 block, since the delta QP 17 can vary for each 8×8 sub-block of the 16×16 block. The register fields may include: Bits 31:24=QP0 (QP for the upper-left 8×8 block); Bits 23-16=QP1 (QP for the upper-right 8×8 block); Bits 15-8=QP2 (QP for the lower-left 8×8 block); and Bits 7-0=QP3 (QP for the lower-right 8×8 block). Legal delta QP 17 values (e.g. valid values) may be from 0-51, in accordance with the HEVC video standard, and in some examples, only these valid delta QP 17 values can be passed in the register and provided for processing. Values other than 0-51 may be non-valid values. For example, a specified value of 0xff may be used to indicate that the delta QP 17 has not yet arrived for the processing block (e.g. PB 15). This may occur in the 64×64 CU 14 case, as discussed above. Thus, when delta QP 17 data loads with the non-valid 0xff value occur, the deblocker processor 54 may hold all the data loads for the PB 15 in the determined storage array 78, and resume reading the data loads for the next PB 15 from the command buffer 57. In a worst-case scenario for the implementation shown, e.g.

where the QP value is assigned to the fourth PB 15, four readings may be necessary. Thus, the size of the storage array 78 may be set to a level sufficient to hold the four data loads.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on single integrated circuit or chip, or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the systems and methods have been described, it will be apparent to those of ordinary skill in the art that many more embodiments and implementations are possible within the scope of the systems and methods. Accordingly, the systems and methods are not to be restricted except in light of the attached claims and their equivalents.

What is claimed is:

1. A method comprising:
by a deblocker processor:
reading a first set of parameters for a first processing block from a buffer;
determining if the first set of parameters does not include a valid quantization value for processing the first processing block;
storing the first set of parameters including transform coefficients in a storage array on the deblocker processor in response to the first set of parameters not including the valid quantization value for processing the first processing block;
operating on the first processing block by at least one of a motion compensation processor, inverse transform processor, and spatial prediction processor based on the first set of parameters stored in the storage array prior to receiving to a valid quantization value corresponding to the first processing block;
reading a subsequent set of parameters for subsequent processing blocks from the buffer; and
processing the first processing block based on a valid quantization value in the subsequent set of parameters, in response to the subsequent set of parameters including the valid quantization value for processing the first processing block.

2. The method of claim 1 further comprising processing, by the deblocker processor, a subsequent processing block based on the subsequent set of parameters in response to the subsequent set of parameters including the valid quantization value.

3. The method of claim 1 further comprising continuing processing by the deblocker processor until the subsequent sets of parameters stored in the storage array are exhausted.

4. The method of claim 1 wherein the first set of parameters includes a non-valid quantization value indicating that the valid quantization value has not yet arrived for the first processing block.

5. A system comprising:
a decoder operable to use High Efficiency Video Coding (HEVC), the decoder comprising a deblocker processor, the deblocker processor operable to:
read a first set of deblocking parameters for a first processing block from a buffer;
determine if the first set of deblocking parameters includes a quantization parameter value or a value indicating that the quantization parameter value has not yet arrived for the first processing block;
hold the first set of deblocking parameters in a storage array in response to the first set of deblocking parameters including the value indicating that the quantization parameter value has not yet arrived for the first processing block;
perform at least one of motion compensation and spatial prediction based on the first set of deblocking parameters stored in the storage array prior to receiving to a valid quantization value corresponding to the first processing block;
read a second set of deblocking parameters for a second processing block from the buffer; and
process the first and second processing blocks based on the quantization parameter value in response to the second set of deblocking parameters including the quantization parameter value.

6. The system of claim 5 wherein the storage array comprises static random access memory embedded in the deblocker processor.

* * * * *